United States Patent Office 3,418,263
Patented Dec. 24, 1968

3,418,263
FIRE RETARDANT POLYMER COMPOSITIONS CONTAINING HALOGENATED-CYCLOPENTADIENE ADDUCTS
Raymond R. Hindersinn, Lewiston, and Harry W. Marciniak, Buffalo, N.Y., assignors to Hooker Chemical Corporation, Niagara Falls, N.Y., a corporation of New York
No Drawing. Filed Nov. 25, 1964, Ser. No. 413,966
18 Claims. (Cl. 260—23)

ABSTRACT OF THE DISCLOSURE

Discoloration resistant, fire retardant polymeric compositions are comprised of (1) a combustible polymer, (2) a fire retarding agent of the formula:

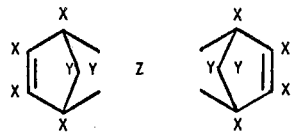

wherein X is selected from the group consisting of bromine, chlorine and fluorine; Y is selected from the group consisting of bromine, chlorine, fluorine, alkyl and alkoxy; and Z is a tetravalent cyclic hydrocarbon radical having at least 5 carbon atoms, and (3) an organo metal stabilizer.

The additive compounds do not migrate from the polymer, do not plasticize the polymer and inhibit color formation. Accordingly, the polymer compositions readily lend themselves to being processed by extrusion and molding.

---

This invention relates to organic compositions which have been rendered fire retardant by the addition of a constant or nonmigrating fire retardant. More particularly, this invention relates to improving color of molding compositions comprised of a halogenated constant or nonmigrating fire retardant and a combustible organic polymeric material wherein a light or white color is desired.

Nonmigrating fire retardants are useful in combustible organic compositions, wherein they improve the heat distortion point, improve fire and flame retardancy and serve other useful purposes. In addition to conferring the foregoing properties, such fire retardants should not discolor the combustible organic composition, either when initially formulated, when molded into useful objects or after prolonged standing.

It has now been found that certain organometallic compounds effectively inhibit the color formation normally associated with the combustible organic compositions containing nonmigrating fire retardants and yet do not adversely affect the useful properties of the protected combustible organic compositions.

In accordance with this invention, there is provided a discoloration resistant fire retardant polymeric composition comprising (1) a combustible polymer (2) a constant fire retarding agent

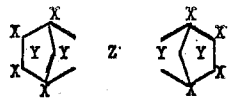

wherein X is selected from the group consisting of bromine, chlorine, and fluorine; Y is selected from the group consisting of bromine, chlorine, fluorine, alkyl and alkoxy; and Z is a tetravalent cyclic hydrocarbon radical having at least five carbon atoms and (3) an organometal stabilizer for the constant fire retardant.

The color stabilizer of this invention is desirably added to the fire retardant polymeric composition in an amount from about 0.1 to about 3 percent and preferably in an amount from about 0.5 to about 2.0 percent by weight of the fire retardant polymer composition. Little advantage is obtained by the employment of larger quantities although amounts greater than 3 percent may be employed as desired. The color stabilizers may be added to the polymer at any suitable time, such as during the blending together of the constant fire retardant material and the polymer to be protected.

The color stabilizers of this invention may be broadly classified into four groups. A more detailed description of each group follows this brief description. The first group may be summarized as a composition comprising a polyvalent metal salt of a substituted or unsubstituted benzoic acid, preferably a cadmium salt, a substituted polyvalent phenolate, preferably, a substituted barium phenolate and an organic phosphite.

The second group of color stabilizers of this invention is a composition comprised of a substituted phenol having from about 7 to about 30 carbon atoms, a polyvalent metal salt of an organic carboxylic acid having from about 6 to 18 carbon atoms and a polyol having the structure

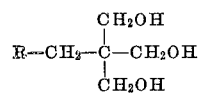

The third group of color stabilizers of this invention comprise an organotin compound having organic radicals linked to tin only through carbon or oxygen, at least two organic radicals being linked through carbon, and at least one organic radical being linked through oxygen to a carbonyl group of an unsaturated dicarboxylic acid ester of an alcohol having from one to two hydroxyl groups.

In addition to the foregoing three classes of organometallic compounds, useful stabilizers in this invention include tetraphenyltin, stannous dioctoate and triphenyltin hydroxide.

Group One stabilizers

More particularly, the first group of organometallic color sabilizer compositions are comprised of a polyvalent metal phenolate, an organic phosphite and a polyvalent metal salt of a benzoic acid.

The polyvalent metal phenolates in this composition have the general formula $M(OR)_n$ wherein $n$ is the valence of the metal (M), M is selected from cadmium, zinc, lead, tin, barium, strontium, and calcium, and R is selected from alkyl substituted phenols and alkyl substituted phenols containing at least one substituent on the alkyl radical which has from 1 to 20 carbon atoms. The polyvalent radical phenolates of the substituted phenols listed below are illustrative of the phenolates that are employed in the stabilizers; butylphenol, monochlorooctylphenol, nonylphenol, oleylphenol, laurylphenol, octadecylphenol and dibutylmethylphenol, etc. The preferred phenolates are barium phenolates containing straight chain alkyl substituents having 6 to 13 carbon atoms; especially preferred are barium octylphenolate and barium nonylphenolate.

The organic phosphites utilized in the stabilizer composition of Group 1 are selected from the class consisting of substituted or unsubstituted alkyl or phenyl phosphates, phosphites containing both alkyl and phenyl groups, organohalophosphites and phosphorus halides containing one or two substituted or unsubstituted alkoxy and/or phenoxy groups bonded to the phosphorus atom. Each organic substituent group of the phosphite contains from 1 to 15 carbon atoms. The phosphite utilized, should be substantially nonvolatile at the conditions under which the resin is worked.

Polyvalent metal salts of the substituted or nonsubstituted benzoic acid employed in group one include the salts of cadmium, zinc, lead, tin, barium, strontium, and calcium. The substituted benzoic acid may contain ring substitution which does not deleteriously affect the properties of the polymer and is not reactive with other components of the formulation, thereby effecting the polymer composition to be protected. Useful permissible substituting groups include fluorine, chlorine, and up to three alkyl (linear or branched) groups, for example, methyl, isopropyl, tertiary butyl, and so forth, the total number of carbon atoms in the substituting alkyl (linear or branched) group being not more than 12. The preferred metal salts are those of cadmium; and the preferred salts are cadmium benzoate and cadmium di(t-tert-butylbenzoate).

These stabilizer compositions contain between about 20 and about 80 percent, preferably about 20 to about 40 percent of the polyvalent salt of the benzoic acid, about 80 to about 20 percent and preferably about 60 to about 40 percent of the poly metal phenolate and about 0.5 to about 50 percent and preferably about 8 to about 20 percent of the phosphite. The preferred stabilizer contains about 20 to 40 percent cadmium di(p-tert-butylbenzoate) or cadmium benzoate, about 45 to about 55 percent of barium octyl phenolate or nonylphenolate and the remainder triphenylphosphite, diphenylchloroethyl phosphite or diphenylchloropropyl phosphite.

Stabilizing compositions of group one are further exemplified in the art such as U.S. Patent 2,935,481 issued May 3, 1960.

Group Two stabilizers

The second group of color stabilizers of this invention are compositions comprised of a polyol, a polyvalent metal salt and a phenol. The polyols employed in the color stabilizer compositions of this group have the structure:

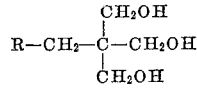

wherein R is hydrogen, alkyl or alkoxy group. The alkyl or alkoxy group may include additional substituents such as hydroxyl or hydroxyl alkyl groups. The R radical in general has from 1 to about 30 carbon atoms. The typical polyols of this formula include dipentaerythritol, trimethylolpropane, trimethylolmethane, trimethylolethane and trimethylolbutane.

The metal salt stabilizer is a salt of a polyvalent metal and a monocarboxylic organic acid having from 6 to 18 carbon atoms. The acid contains no nitrogen atoms in the molecule. As a class these acids may be aliphatic, aromatic, alicyclic and oxygen containing heterocyclic monocarboxylic acids. The acids may be substituted with groups, such as halogen, sulfur and hydroxyl. As exemplary of such acids are: caproic acid, capric acid, 2-ethylhexoic acid, lauric acid, chlorocaproic acid, hydroxycapric, stearic acid, hydroxystearic acid, oleic acid, myristic acid, dodecyl thioether propionic acid, monoethyl ester of phthalic acid, ethylbenzoic acid, isopropylbenzoic acid, p-tert-butylbenzoic acid, n-hexylbenzoic acid, salicylic acid, naphthoic acid, 1-naphthylene acetic acid, orthobenzoylbenzoic acid, methylfuroic acid, and the like. These are used in the form of their metal salts, particularly the alkaline earth metal salts, such as magnesium, barium, strontium, calcium, zinc, cadmium, lead, and tin salts. The barium, cadmium and zinc compounds are preferred Suitable salts include barium laurate, cadmium laurate, cadmium benzoate, cadmium tert-butylbenzoate, cadmium stearate, zinc stearate, and the like.

The third component of the composition of group two coolr stabilizers is a hydrocarbon substituted phenol having at least one phenolic hydroxyl group and from 1 to about 30 carbon atoms per phenolic hydroxyl group. The phenol contains one or more phenolic nuclei. The phenol will have one or a plurality of alkyl, aryl, or cylcloalkyl substituents or a second ring condensed therewith as a napthol having one or more carbon atoms, up to the total number of carbon atoms per phenolic hydroxyl group. Usually the phenols will have up to about 18 carbon atoms in any alkyl, aryl, cycloalkyl, alicyclidene or alkylene group.

Exemplary phenols are ortho-, meta- and para-cresol, ortho-, meta- and para-phenylphenol, xylenol, nonylphenol, dodecylphenol, octylphenol, octylresorcinol, dodecylresorcinol, octadecylcatachol, isooctylphloroglucinol, 2,6 - ditertiarybutylresorcinol, 2,2 - bis - (4 - hydroxyphenyl) propane, alpha and beta naphthol, mono and di-tert-butyl substituted alpha and beta naphthols and the like.

The three components of the stabilizer of group two are utilized in the proportion of about 5 to 60 percent polyol, from about 5 to 60 percent hydrocarbon substituted phenol and from 90 to 35 percent metal salt.

Stabilizing compositions of the foregoing group are further exemplified in publications, such as Canadian Patent 666,161, issued July 2, 1963.

Group Three stabilizers

The preferred organo tin compounds utilized in the third group of stabilizers are of the formula:

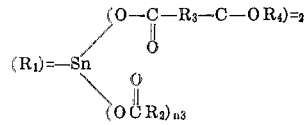

wherein $R_1$ and $R_2$ are hydrocarbon radicals having from about 1 to about 30 carbon atoms, which can contain inert substituents, such as halogen, ether and ester groups. $R_1$ can, for example, be an aliphatic group, such as alkyl and alkenyl, cycloalphatic, such as cycloalkyl and cycloalkenyl, or a heterocyclic group. Included are radicals, such as methyl, ethyl, isopropyl, butenyl, vinyl, tertiary butyl, hexyl, oleyl, 2-ethylhexyl, lauryl, stearyl, allyl, furfuryl, cyclohexyl, cyclopentyl, tetrahydropyranyl and tetrahydrofurfuryl.

The

group can be derived from an organic carboxylic acid of the formula $R_2COOH$ including aliphatic aromatic, cycloaliphatic and heterocyclic acid which can contain inert substitutents, such as halogen, hydroxyl, keto and alkoxy groups. Illustrative acids include acetic acid, propionic acid, oleic acid, ricinoleic acid, linoleic acid, stearic acid, maleic acid, chloroacetic acid, hexanoic aid, octanoic acid, lactic acid, levulinic acid, 4-methoxybutyric acid, lauric acid, behenic acid, palmitic acid, benzoic acid, methylbenzoic acid, and furoic acid.

$R_3$ is a hydrocarbon group containing from one to about 30 carbon atoms and containing an ethylenic double bond. The ethylenic double bond is alpha to a carboxyl group. The $R_3$ groups are derivable from alpha unsaturated dicarboxylic acid containing from about 4 to about 10 carbon atoms, such as maleic acid, fumaric acid, itaconic acid, glutaconic acid, citraconic acid, 2-hexene-1,4-dicarboxylic acid, 2-octene-1,8-dioic acid and 2,5-heptadienedioic acid.

The $R_4$ is an organic group derivable from a monohydric or a polyhydric alcohol. $R_4$ can be alkyl, alkenyl, alkylene, arylene, mixed alkyl-aryl, cycloaliphatic and heterocyclic and contain from about 1 to 30 carbon atoms and also contain esters groups, alkoxy groups, hydroxyl groups and other inert substituents. Preferably $R_4$ is derived from a dihydric alcohol, such as a glycol containing from 2 to abuot 30 carbon atoms including ethylene glycol, propylene glycol, diethylene glycol, dipropylene glycol, tetramethylene glycol, neopentyl glycol and decamethylene glycol or from monohydric alcohols containing from one to 30 carbon atoms, such as methyl, ethyl, propyl, n-butyl, t-butyl, isobutyl, octyl, decyl, and lauryl alcohols.

The sum of $n_1$, $n_2$, and $n_3$ is four, $n_1$ is either two or three, $n_2$ can range from zero to two and $n_3$ can range from zero to two.

Typical organo tin compounds employable in this invention include dibutyltin-bis(dipropyleneglycolmaleate), di-n-octyltin - bis(dipropyleneglycolmonomaleate), tri-n-octyltin monoisooctylmaleate, dibutyltin, diacetate, dibutyltin dilaurate, dibutyltin-bis(monoisooctylfumarate), di-n-octyltin-diisooctylmaleate, dibutyltin - bis(monoisooctylmaleate), ethyl - n - butyltin - bis (octylmaleate), diisobutyltin - bis(propyleneglycolmonomaleate), diisopropyltin-bis(dipropyleneglycolmaleate), n - butyl undecyltin - bis(diethyleneglycolmonomaleate), di - n-butyltin - bis(ethoxyethylmaleate), isobutylcyclohexyltin monophenylmaleate monoethoxy ethylmaleate, isooctyl undecyltin monoisooctylmaleate dipropolyeneglycolmonomaleate and the like.

The non-migrating fire retardants of this invention are Diels-Alder adducts of halogenated cyclopentadiene, having a melting point above 250 degrees centigrade, a vapor pressure of less than 0.10 millimeter of mercury at 197 degrees centigrade and a halogen content of at least 40 percent which, when admixed with a polymeric composition imparts to the polymeric composition an extremely constant fire retardant effect. These fire retardants are obtained when 2 moles of halogenated cyclopentadiene are adducted with one mole of a polyolefin which is either aliphatic, such as 1,7-octadiene, or cyclo aliphatic, such as 1,5 cyclo-octadiene.

The preferred constant fire retarding agent is a compound of the formula

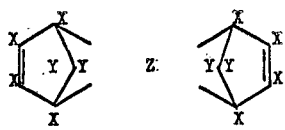

wherein X is selected from the group consisting of bromine, chlorine and fluorine, Y is selected from the group consisting of bromine, chlorine, fluorine, alkyl and alkoxy, Z is a tetravalent cyclic hydrocarbon radical having at least 5 carbon atoms, which may be substituted with lower alkyl of 1 to 6 carbon atoms, chlorine, bromine or fluorine. The alkyl and alkoxy radicals mentioned generally have 1 to 10 carbon atoms and preferably are of 1 to 6 carbon atoms. Z is a cyclic hydrocarbon of 5 to 18 carbon atoms and from 1 to 5 cyclic structures. When Z is a plurality of cyclic structures, they are fused, that is, they share carbon atoms.

Such a compound may be made by adducting (Diels-Alder reaction) one mole of a polyunsaturated cycloaliphatic compound and two or more moles of a polyhalgenated cyclpentadiene of the formula

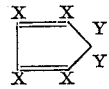

X and Y have the same definition as previously stated. The polyunsaturated cycloaliphatic compound mentioned above contains 5 to 18 carbon atoms, has 1 to 5 cyclic structures and, when more than one of the cyclic structures are fused, has at least two sites of carbon to carbon unsaturation which may be either ethylenic or acetylenic.

Illustrative of the polyhalogenated cyclopentadienes suitable for use in this invention are hexachlorocyclopentadiene, 5,5 - dimethoxytetrachlorocyclopentadiene, hexabromocyclopentadiene, 5,5 - difluorotetrachlorocyclopentadiene, 5, 5 - dibromotetrachlorocyclopentadiene and 5,5 - diethoxytetrachlorocyclopentadiene.

Satisfactory polyunsaturated aliphatic compounds for use in preparing the Diels-Alder adduct with

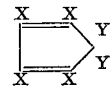

include cycloaliphatic compounds exemplified by but not limited to methyl cyclopentadiene, cyclopentadiene, dicyclopentadiene, bicyclo(2.2.1) heptadiene, 1,5-cyclooctadiene, cyclodecadiene and cyclododecadiene, The preparation of 1,4,7,10-dimethanocycloocta-1,2,3,-4,7,8,9,10,13,13,14,14-dodecachloro - 1,4,4a,5,6,6a,7,10,-10a,11,12,12a - dodecahydro [1,2,5,6]dibenzene is disclosed by Ziegler and Froitzheim-Kühlhorn, Annalen, 1959, 589,157. This compound's structure is believed to be

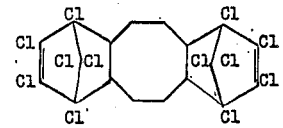

For convenience this compound will be referred to by the short title of 1,5 COD. The adduct is prepared by condensing two moles of hexachlorocyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,6,7,8,9,13,13,14,14-dodecachloro - 1,4,5,5a,6,9,10,10a,11,11,12,12 - dodecahydro-1,4:5,10:6,9 - trimethano - 11 - H-benzo[b]fluorene is prepared by condensing two moles of hexachlorocyclopentadiene with one mole of dicyclopentadiene. The adduct has the assigned structure:

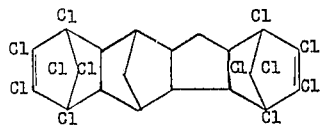

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11 - dodecachloro-1,4, 4a,4b,5,8,8a,9a - octahydro-1,4:5,8-dimethanefluorene is prepared by condensing two moles of hexachlorocyclopentadiene with one mole of cyclopentadiene. This adduct has the assigned structure:

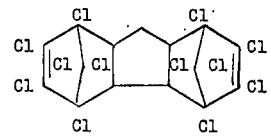

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13-dodecachloro-1, 4,4a,5,8,8a,9,9a,10,10a - decahydro - 1,4:5,8:9,10 - trimethano-anthracene is prepared by condensing one mole of the Diels-Alder adduct of cyclopentadiene and acetylene with two moles of hexachlorocyclopentadiene. The resulting adduct has the assigned structure:

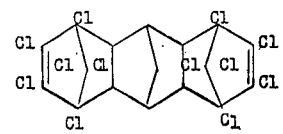

For convenience this adduct will be referred to as BCH. BCH melts at about 340 degrees centigrade and has a vapor pressure of 0.008 millimeter of mercury at 197 degrees centigrade.

The fire retardant additives of this invention remain in the protected polymeric composition even after prolonged exposure of the plastic article to high temperatures only from 0.3 to 4 percent of retardant may be lost or transferred when a standard polypropylene sample (55 percent polymer, 30 percent additive) is heated at 120 degrees centigrade for seven days as compared to twenty-five fold greater loss for many more conventional fire retardants.

The polymeric compositions and coatings of this invention include high molecular weight polymers and resins as well as the intermediate molecular weight materials utilized for coatings and paints. The polymers embraced within the scope of this invention include the homopolymers and copolymers of unsaturated aliphatic, alicyclic, and aromatic hydrocarbons. Suitable monomers are ethylene, propylene, butene, pentene, hexene, heptene, octene, 2-methylpropene-1, 3-methylbutene-1,4-methylpentene-1, 4-methylhexene-1, 5-methyl-hexene-1, bicyclo-(2.2.1)-heptene, butadiene, pentadiene, hexadiene, isoprene, 2,3-dimethylbutadiene-1,3, 2-methylpentadiene-1,3, 4-vinyl-cyclohexene, vinylcyclohexene, cyclopentadiene, styrene and methylstyrene, and the like.

Two of the polymers of this group, polyethylene and polystyrene, have long been known in the art. Low-density (0.92 grams/cc.) polyethylene may be produced by the polymerization of ethylene at a pressure greater than twelve hundred atmospheres and at a temperature of one hundred to three hundred degrees centigrade. Lower pressures, of about five hundred atmospheres can be used if a catalyst such as oxygen or benzoyl peroxide is added to the ethylene as described by Fawcett et al., Chemical Abstracts, 32, 1362 (1938).

Polystyrene is readily produced by mass, solution or emulsion polymerization as described in The Technology of Plastics and Resins, Mason, J. P., and Manning, J. F., Van Nostrand Company (1945).

In recent years a new field of linear and stereoregular polymers has become available which may be improved by this invention. Such polymers, such as those of polypropylene, are produced with organometallic catalysts and supported metal oxide catalysts as disclosed in great detail in Linear and Stereoregular Addition Polymers: Polymerization With Controlled Propagation, Gaylord, N. G., and Mark, H. F., Interscience Publishers, Inc. (1959).

Other polymers also within the scope of this invention include the polyesters, alkyds and paint vehicles, such as bodied linseed oil, nylons, diallyl phthalates and phthalates, and polycarbonates. Polycarbonates are thermoplastic resins formed from a dihydroxy compound and a carbonate diester. The more important commercial polycarbonates are made from bis(4-hydroxyphenyl)-2,2-propane and phosgene. Polyesters are thermoplastic resins produced by the reaction of dibasic acids and dihydroxy compounds. The unsaturated polyesters can be further polymerized by crosslinking. Alkyds are in many respects similar to polyesters, but alkyds utilize unsaturated fatty acids. Resins within the scope of this invention include the condensation reaction products of phenol and aldehyde, e.g., novolacs and thermoplastic polymers of bis(4-hydroxyphenyl)-2,2-propane and epichlorohydrin.

A very useful thermoplastic polymer for molded articles is the terpolymer acrylonitrile-butadiene-styrene series of polymers, commonly referred to as ABS. The acrylonitrile content of these polymers ranges up to about 23 percent. The balance of the polymers being such combination of butadiene and styrene as will yield the final desirable property sought for the particular polymer in question.

The halogenated Diels-Alder adducts are incorporated in the polymeric materials in an effective fire retardant amount. Generally, the constant fire retardants in the amount of from about 2 to about 50 percent by weight of the polymeric composition, desirably from about 5 to 40 percent by weight and preferably from about 10 to 35 percent are mixed with polymeric composition. Improved fire retardance can be provided by incorporating in the polymeric compositions metallic compounds, such as oxides, wherein the metal is selected from the group consisting of antimony, arsenic, and bismuth in an amount from about 1 to about 30 percent by weight of the said polymeric composition, preferably about 2 to 25 percent.

Antimony trioxide is an antimony compound that is presently preferred for use in the present invention. However, many antimony compounds are suitable. Suitable antimony compounds include the sulfides, antimony salts of the alkali metals of Group I of the Periodic Table, antimony salts of organic acids and their pentavalent derivatives and the esters of antimonous acids and their pentavalent derivatives. It is convenient to use sodium antimonite or potassium antimonite when it is desired to use an alkali metal salt of antimony for compositions of this invention. The corresponding arsenic and bismuth compounds can also be employed, e.g., the oxides of arsenic and bismuth.

The components of the compositions of the instant invention can be mixed or compounded by any one of several methods. Usually, the additives are mixed with the polymer in the molten state at a temperature that can range from the melting point to the decomposition temperature of the polymer, e.g., from 70 to 600 degrees centigrade. Alternatively, the additives and the polymer are dry blended into a finely divided state so that an intimate mixture is obtained for subsequent extrusion or molding.

The invention is illustrated by the following examples, which are not intended to limit the scope of the invention. Unless otherwise stated, all parts are by weight and all temperatures are in degrees centigrade. In these examples, the color of the stabilized polymer compositions is rated on a scale from 1 to 10 with 1 being the most preferred color, 9 is the control and 10 being most unsatisfactory. The rating 1–3 may be further defined as off-white to slightly tanned, 4–5 as being tan to light brown, 6–7 noticeable improvement over the control, 8 some improvement and 10 worse than the control.

The color stabilizing properties may be conveniently demonstrated in the laboratory by dry blending together the selected color stabilizer, with the polymer and constant fire retardant and or other additives of the desired composition. Thereafter a ten gram portion of the completely blended composition may be packed into a glass tube, seven millimeters in diameter and closed at one end. The tubes are then immersed into a salt bath for fifteen minutes at a temperature of 550 degrees Fahrenheit (288 degrees centigrade). The tubes are then withdrawn and the colors are observed and compared against the control. The satisfactory stabilizers are then blended into larger amounts of the test composition for extrusion and injection molding. The extrusion process is carried out at 325 to 350 degrees Fahrenheit (about 170 degrees centigrade). This is well below the discoloration temperature of a non-stabilizer composition. The resulting pellets are then injection molded in a plunger type molding machine at various temperatures to determine when discoloration occurs. They are then compared to a similar non-stabilized composition.

Example 1.—Polypropylene compositions

A test composition was prepared by dry blending together in a finely divided state 60 parts of general purpose polypropylene, 36.5 parts of 1,5 COD and 3.5 percent of antimony trioxide. To portions of the mixed blend were added various amounts of the stabilizers indicated below. The compositions were then charged to the glass tubes previously described and immersed in the salt bath for fifteen minutes at 288 degrees centigrade. The specimens were then rated as to color and the results tabulated as follows:

| Stabilizer | Parts of Stabilizer Per 100 Parts Polymer Mixture | Color Rating |
|---|---|---|
| Dibutyltin bis(isooctylmaleate) | 2 | 2 |
| Do | 1 | 2 |
| Dibutyltin maleate | 1 | 3 |
| Dibutyltin diacetate | 1 | 4 |
| Dibutyltin dilaurate | 2 | 5 |
| Do | 1 | 6 |
| Stabilizer Y [1] | 1 | 8 |
| Control | None | 9 |

[1] Stabilizer Y is comprised of about 26 percent of a barium benzoate, about 64 percent by weight of a cadmium benzoate, about 5 percent of a phenol and about 5 percent of a polyol.

Example 2.—Polystyrene compositions

A polymer composition comprised of 80 parts of general purpose polystyrene, 18 parts of 1,5 COD and 2 parts of antimony trioxide was prepared and tested in the manner of Example 1. The results are as follows:

| Stabilizer | Parts of Stabilizer Per 100 Parts Polymer Mixture | Color Rating |
|---|---|---|
| Dibutyltin maleate | 1 | 2 |
| Dibutyltin diacetate | 1 | 2 |
| Dibutyltin dilaurate | 2 | 3 |
| Tetraphenyltin | 1 | 3 |
| Dibutyltin bis(isooctylmaleate) | 2 | 4 |
| Do | 1 | 6 |
| Stabilizer Y | 1 | 8 |
| Control | None | 9 |
| Nitrile type polyvinyl chloride stabilizer | 1 | 10 |

Example 3.—ABS terpolymers

ABS terpolymers compositions were prepared and tested in the manner of Example 1. The results are as follows:

| Stabilizer | Parts of Stabilizer Per 100 Parts Polymer Mixture | Color Rating |
|---|---|---|
| A. Polymer only: Dibutyltin bis(isooctylmaleate) | 1 | 2 |
| Dibutyltin dilaurate | 1 | 2 |
| B. 75 parts of ABS polymer and 25 parts of 1,5 COD: | | |
| Dibutyltin bis(isooctylmaleate) | 1 | [1] 1 |
| Dibutyltin dilaurate | 1 | 1 |
| Stabilizer V [2] | 1 | 1 |
| C. Polymer 62.5 parts ABS, 25 parts of 1,5 COD and 12.5 parts of antimony trioxide: | | |
| Dibutyltin bis(isooctylmaleate) | 1 | 2 |
| Dibutyltin dilaurate | 1 | 3 |
| Tetraphenyltin | 1 | 4 |
| Triphenyltin hydroxide | 1 | 4 |
| Dibutyltin diacetate | 1 | 5 |
| Stannous dioctoate | 1 | 6 |
| Control | None | 9 |
| Stannous chloride | 1 | 10 |
| Stannic oxide | 1 | 10 |

[1] Substantially same as the untested portion.
[2] Stabilizer V is a composition comprised of about 46 percent by weight of barium di(nonylphenolate), about 35 percent of cadmium di(p-tert-butyl benzoate) and about 20 percent of triphenyl phosphite.

Example 4.—Nylon compositions

Nylon 6 (caprolactam polycondensate) compositions were prepared and tested in the manner of Example 1. The results are as follows:

| Stabilizer | Parts of Stabilizer Per 100 Parts Polymer Mixture | Color Rating |
|---|---|---|
| A. Nylon 70 parts, 1,5 COD 20 parts, 10 parts antimony trioxide: | | |
| Stabilizer V | 1 | 4 |
| Dibutyltin dilaurate | 1 | 6 |
| Dibutyltin bis(isooctylmaleate) | 1 | 6 |
| None | None | 9 |
| B. Nylon 60 parts, 1,5 COD 36 parts, 4 parts antimony oxide: | | |
| Stabilizer V | 1 | 4 |
| Dibutyltin bis(isooctylmaleate) | 1 | 5 |
| Tetraphenyltin | 1 | 6 |
| Dibutyltin dilaurate | 1 | 6 |
| Barium/cadmium laurate mixture | 1 | 7 |
| None | None | 9 |

Example 5.—Polyethylene compositions

A composition comprised of 60 parts of general purpose grade polyethylene, 35 parts of 1,5 COD and 5 parts of antimony trioxide was prepared and tested in the manner of Example 1.

| Stabilizer | Parts of Stabilizer Per 100 Parts Polymer Mixture | Color Rating |
|---|---|---|
| Dibutyltin bis(isooctylmaleate) | 1 | 4 |
| Dibutyltin dilaurate | 1 | 6 |
| None | None | 9 |

Example 6

In this example the properties of the molded polymer compositions were tested in accordance with American Society for Testing Materials (ASTM) test procedure ASTM D-635-56T. In this test, a specimen can fall into one of three categories: (1) burning (the rate is reported), (2) self-extinguishing upon removal of flame and (3) non-burning. A composition containing 62.5 parts by weight ABS terpolymer, 25 parts of 1,5 COD, 12.5 parts of antimony trioxide and 1 part dibutyltin bis(isooctylmaleate) was self extinguishing in 2.4 seconds. Similar results are obtained when equal amounts of dibutyltin dilaurate, dibutyltin diacetate, Stabilizer Y, Stabilizer V or tetraphenyltin is used. Comparable results are obtained when other polymers are substituted for the ABS terpolymer.

Similar results are obtained when other color stabilizers of this invention are used in place of the foregoing mentioned stabilizers in the illustrative compositions shown in Examples 1 through 6.

Various changes and modifications may be made in the method and apparatus of the invention, certain preferred forms of which have been herein described, without parting from the spirit and scope of the present invention.

What is claimed is:

1. A fire retardant polymeric composition comprised of (1) a normally combustible polymer, (2) an effective fire retardant proportion of a fire retardant agent of the formula:

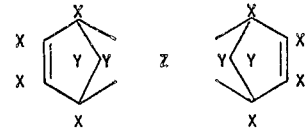

wherein X is selected from the group consisting of bromine, chlorine and fluorine; Y is selected from the group consisting of bromine, fluorine, chlorine, alkyl and alkoxy; and Z is a tetravalent cycloaliphatic hydrocarbon having at least five carbon atoms, and (3) an organometal stabilizer for the fire retardant wherein the metal is selected from the group consisting of cadmium, zinc, lead, tin, barium, strontium, calcium and magnesium; wherein said polymer is selected from the group consisting of a polymer of an unsaturated hydrocarbon, a polyester, a polycarbonate, a polyamide polymer, a thermoplastic polymer of a bisphenol and epichlorohydrin, a diallyl phthalate resin and a condensation product of phenol and an aldehyde.

2. The composition according to claim 1 wherein the stabilizer is present in an amount from about 0.1 to about 3 percent weight of the total weight of combustible polymer and fire retardant agent.

3. The composition according to claim 1 wherein the stabilizer is selected from the group consisting of
   (a) a composition comprising a cadmium, zinc, lead, tin, barium, strontium, calcium or magnesium salt of a benzoic acid, a cadmium, zinc, lead, tin, barium, strontium, calcium or magnesium phenolate and an organic phosphite, (b) a composition comprising a hydrocarbon-substituted phenol having from about 7 to about 30 carbon atoms, a cadmium, zinc, lead, tin, barium, strontium, calcium or magnesium salt of an organic carboxylic acid containing from about 6 to about 18 carbon atoms, and a polyol having the structure

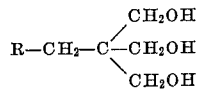

in which R is an organic radical selected from the group consisting of alkyl, alkoxy, hydroxyalkyl and alkoxy hydroxyalkyl groups having from one to about thirty carbon atoms, (c) an organotin compound having organic radicals linked to tin only through carbon and oxygen, at least two organic radicals being linked through carbon, and at least one organic radical being linked through oxygen to a carboxyl group of an unsaturated dicarboxylic acid ester of an alcohol having from one to two hydroxyl groups, (d) an organotin compound selected from the group consisting of tetraphenyltin, stannous dioctoate and triphenyltin hydroxide and (e) mixtures thereof.

4. The composition according to claim 3 wherein the stabilizer is present in an amount from about 0.5 to about 2.0 percent by weight of the combined weight of normally combustible polymer and fire retardant.

5. The composition according to claim 1 wherein the stabilizer is comprised of about 26 percent of a barium benzoate, about 64 percent of a cadmium benzoate, about 5 percent of a phenol and about 5 percent of a polyol.

6. Composition according to claim 1 wherein the stabilizer is a composition comprised of about 45 percent by weight of barium di(nonylphenolate), about 35 percent of cadmium di(p-tert-butylbenzoate) and about 20 percent of triphenyl phosphite.

7. The composition according to claim 1 wherein the stabilizer is dibutyltin bis(isooctylmaleate).

8. Composition according to claim 1 wherein the stabilizer is dibutyltin diacetate.

9. Composition according to claim 1 wherein the stabilizer is dibutyltin dilaurate.

10. The composition according to claim 1 wherein the stabilizer is tetraphenyltin.

11. The composition according to claim 1 wherein the combustible polymer is a terpolymer of acrylonitrile, butadiene and styrene.

12. The composition according to claim 1 wherein the combustible polymer is polyethylene.

13. The composition according to claim 1 wherein the combustible polymer is polypropylene.

14. The composition according to claim 1 wherein the combustible polymer is polystyrene.

15. The composition according to claim 1 wherein the combustible polymer is nylon.

16. A fire retardant polymer composition comprised of (1) acrylonitrile- butadiene-styrene terpolymer, (2) an effective fire retardant proportion of 1,4,7,10-dimethanocycloocta - 1,2,3,4,7,8,9,10,13,13,14,14-dodecachloro-1,4,4a,5,6,6a,7,10,10a,11,12,12a - dodecahydro [1,2,5,6] dibenzene and (3) dibutyltin bis(isooctylmaleate).

17. A fire retardant polymeric composition comprised of (1) a combustible polymer, (2) an effective fire retardant proportion of a fire retardant of the formula:

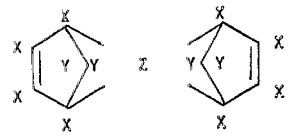

wherein X is selected from the group consisting of bromine, chlorine, and fluorine; Y is selected from the group consisting of bromine, chlorine, fluorine, alkyl and alkoxy; and Z is a tetravalent cycloaliphatic hydrocarbon having at least five carbon atoms, (3) an organometal stabilizer for the fire retardant wherein the metal is selected from the group consisting of cadmium, zinc, lead, tin, barium, strontium, calcium and magnesium, and (4) a metallic compound selected from the group consisting of antimony, arsenic and bismuth; wherein said polymer is selected from the group consisting of a polymer of an unsaturated hydrocarbon, a polyester, a polycarbonate, a polyamide polymer, a thermoplastic polymer of a bisphenol and epichlorohydrin, a diallyl phthalate resin and a condensation product of phenol and an aldehyde.

18. A fire retardant polymeric composition comprising a normally combustible polymer, an effective fire retardant proportion of a fire retardant compound which is a Diels-Alder adduct of a cyclopentadiene of the formula:

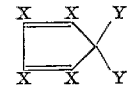

wherein X is selected from the group consisting of bromine, chlorine and fluorine; Y is selected from the group consisting of bromine, chlorine, fluorine, alkyl and alkoxy, and a polyunsaturated cycloaliphatic compound, said adduct having a melting point of at least 250 degrees centigrade and a vapor pressure of less than 0.1 millimeter of mercury at 197 degrees centigrade and an organometal stabilizer for the fire retardant wherein the metal is selected from the group consisting of cadmium, zinc, lead, tin, barium, strontium, calcium and magnesium; wherein said polymer is selected from the group consisting of a polymer of an unsaturated hydrocarbon, a polyester, a polycarbonate, a polyamide polymer, a thermoplastic polymer of a bisphenol and epichlorohydrin, a diallyl phthalate resin and a condensation product of phenol and an aldehyde.

References Cited

UNITED STATES PATENTS

| | | | |
|---|---|---|---|
| 2,606,910 | 8/1952 | Herzfeld et al. | 260—648 |
| 2,935,491 | 5/1960 | Mack | 260—45.75 |
| 2,985,617 | 5/1961 | Salyer et al. | 260—45.7 |
| 3,313,763 | 3/1967 | Creighton et al. | 106—15 |

FOREIGN PATENTS 666,161  7/1963  Canada.

OTHER REFERENCES

Chemical Reviews, vol. 58, April 1958, No. 2, pp. 250, 255 and 256; article by Ungnade et al.

DONALD E. CZAJA, *Primary Examiner.*

R. W. GRIFFIN, *Assistant Examiner.*

U.S. Cl. X.R.

106—15, 16; 260—18, 19, 22, 23.7, 45.7, 45.75, 45.85, 45.95